United States Patent [19]

Allen

[11] 4,110,224
[45] Aug. 29, 1978

[54] SECONDARY RECOVERY PROCESS UTILIZING WATER SATURATED WITH GAS

[75] Inventor: Joseph C. Allen, Bellaire, Tex.

[73] Assignee: Texaco Inc., New York, N.Y.

[21] Appl. No.: 801,186

[22] Filed: May 27, 1977

Related U.S. Application Data

[60] Continuation-in-part of Ser. No. 724,894, Sep. 20, 1976, abandoned, which is a division of Ser. No. 564,390, Apr. 2, 1975, Pat. No. 4,044,831.

[51] Int. Cl.$^2$ ............................................. E21B 43/22
[52] U.S. Cl. ................................ 252/8.55 D; 166/275; 260/283 S; 260/287 R
[58] Field of Search ................... 252/8.55 D; 166/272, 166/273, 274, 275; 260/283 S, 287 R

[56] References Cited

U.S. PATENT DOCUMENTS

| | | | |
|---|---|---|---|
| 1,658,305 | 2/1928 | Russell | 166/273 |
| 3,207,217 | 9/1965 | Woertz | 166/273 |
| 3,227,210 | 1/1966 | Trantham | 166/273 X |
| 3,386,506 | 6/1968 | Quance | 166/273 |
| 3,554,286 | 1/1971 | Feuerbacher et al. | 166/272 X |
| 3,731,741 | 5/1973 | Palmer et al. | 166/272 |
| 4,043,922 | 8/1977 | Palmer et al. | 252/8.55 |

*Primary Examiner*—Herbert B. Guynn
*Attorney, Agent, or Firm*—Carl G. Ries; Thomas H. Whaley; Walter D. Hunter

[57] ABSTRACT

Hydrocarbons are recovered from subterranean formations by injecting into a hydrocarbon bearing formation via an injection well a fluid comprising water saturated with a gas such as natural gas, carbon dioxide, etc., forcing the said fluid through the formation and recovering hydrocarbons through a production well. The fluids employed may contain a solubilizing agent and/or an alkaline agent.

6 Claims, No Drawings

SECONDARY RECOVERY PROCESS UTILIZING WATER SATURATED WITH GAS

This application is a continuation-in-part of application Ser. No. 724,894, filed Sept. 20, 1976, now abandoned, which is a divisional application of application Ser. No. 564,390, filed Apr. 2, 1975, now U.S. Pat. No. 4,044,831.

BACKGROUND OF THE INVENTION

1. Field of the Invention

This invention relates to a secondary recovery process for recovering hydrocarbons from a subterranean hydrocarbon-bearing formation penetrated by an injection well and a production well wherein a fluid such as water saturated with a gas is utilized to displace hydrocarbons in the formation toward a production well.

2. Prior Art

The production of petroleum products is usually accomplished by drilling into a hydrocarbon-bearing formation and utilizing one of the well-known recovery methods for the recovery of hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 70–80 percent of the original hydrocarbons in place.

Thus, may large reserves of petroleum fluids from which only small recoveries have been realized by present commercial recovery methods, are yet to reach a potential recovery approaching their estimated oil-in-place.

Water flooding is one of the more widely practiced secondary recovery methods. A successful water flood may result in recovery of 30–50 percent of the original hydrocarbons left in place. However, generally the application of water flooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery of this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes. Another disadvantage is the tendency of the aqueous drive fluid to remove additional gas by diffusion from the in-place oil thus further reducing the already lowered formation oil volume and increasing the viscosity of the oil.

There is a definite need in the art for a water flooding process in which the aqueous fluid forced through the formation does not remove gas from the in-place oil.

SUMMARY OF THE INVENTION

This invention relates to a process for recovering hydrocarbons from a subterranean hydrocarbon-bearing formation penetrated by an injection well and a production well which comprises:

a. injecting into the formation via an injection well a driving fluid comprising water saturated at the injection pressure with a gas selected from the group consisting of natural gas, air, carbon dioxide, flue gas, ammonia and mixtures thereof, b. forcing the said fluid through the formation and c. recovering hydrocarbons through the production well.

Another embodiment of this invention relates to the driving fluid compositions involved in step (a).

DETAILED DESCRIPTION OF THE INVENTION

Prior to practicing the process of this invention it is sometime desirable to open up a communication path through the formation by a hydraulic fracturing operation. Hydraulic fracturing is a well-known technique for establishing a communication path between an injection well and a production well. Fracturing is usually accomplished by forcing a liquid such as water, oil or any other suitable hydrocarbon fraction into the formation at pressures of from about 300 to about 3000 psig which are sufficient to rupture the formation and to open up channels therein. By use of this method it is possible to position the fracture at any desired vertical location with respect to the bottom of the oil-filled zone. It is not essential that the fracture planes be horizontally oriented, although it is, of course, preferable that they be. After the fracture has been established, and without diminishing the fracture pressure, a propping agent may be injected into the fraction in order to prevent healing of the fracture which would destroy its usefulness for fluid flow communication purposes. Gravel, metal shot, glass beads, sand, etc. and mixtures thereof are generally employed as propping agents. When sand is utilized as the propping agent particles having a Tyler mesh size of from about 8 to about 40 are preferred (i.e., from about 0.016 to about 0.093 inches).

In the next step of the process of this invention the driving fluid is prepared by saturating water with gas such as natural gas, air carbon dioxide, flue gas, ammonia and mixtures thereof at pressure of about 100 to about 6000 psi and at a temperature of about 40° to about 150° F. Generally the injection pressure will vary from about 300 to about 3000 psig. The temperature of the gas-saturated water injected into the formation via the injection well can likewise be varied over a wide-range and generally will be from about 40° to about 150° F and preferably from about 70° to about 100° F.

If desired, the driving fluid, that is the gas-saturated water employed may comprise alkaline gas-saturated water or an alkaline, gas-saturated, water composition containing a minor amount of a solubilizing agent. Generally, the amount of the solubilizing agent present in the driving fluid will range from 0.001 to about 0.25 weight percent or more. The advantageous results achieved with the aqueous alkaline medium used in the process of this invention are believed to be derived from the wettability improving characteristics of the alkaline agent and when the solubilizing agent is employed it is believed that the advantageous results are derived from the solubilizing action on the crude oil and especially on the asphaltene fractions. The solubilizing agent is believed to be effective in releasing the crude from the pore surface or sand surfaces as the case may be so that the surface can be exposed to the alkaline agent.

Useful alkaline agents include compounds selected from the group consisting of alkali metal hydroxides, alkaline earth metal hydroxides, and a basic salt of the alkali metal or alkaline earth metals which is capable of hydrolyzing in an aqueous medium to a given alkaline solution. The concentration of the alkaline agent employed is generally from about 0.001 to 0.5 molar to give the required alkaline solution. Also, alkaline materials such as sodium hypochlorite are highly effective as alkaline agents. Examples of these especially useful alkaline agents include sodium hydroxide, potassium hydroxide, lithium hydroxide, ammonium hydroxide, sodium hypochlorite, sodium carbonate, and potassium carbonate.

A wide variety of solubilizing agents are useful in the process of this invention including water-soluble oxyalkylated, nitrogen-containing aromatic compounds where preferably the initiator, i.e., the aromatic compound, contains not more than 12 carbon atoms and the number of oxyalkyl units is about 5 to about 60. One especially useful group of the water-soluble, oxyalkylated, nitrogen-containing aromatic compounds are those having the formula:

R(OR')$_a$OH, wherein R is selected from the group consisting of:

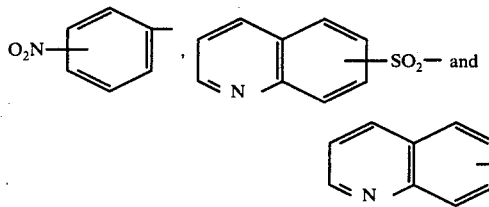

wherein R' is alkylene of from 2 to 4 inclusive carbon atoms and $a$ is an integer of from about 5 to about 50 and preferably from about 5 to about 20. These novel water-soluble, oxyalkylated products can be conveniently prepared by a number of processes well-known in the art and one method for their preparation is more completely described in U.S. Pat. No. 3,731,741 which is incorporated herein by reference in its entirety.

Another group of solubilizing agents which are highly useful in the process of this invention include block-type oxyalkylated compounds of the formula:

R(OC$_3$H$_6$)$_b$(OC$_2$H$_4$)$_c$OH wherein R is selected from the group consisting of:

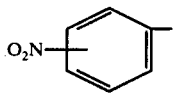    a)

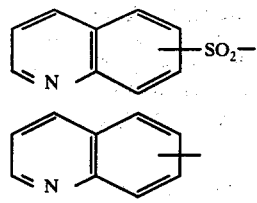    b)

c)

$b$ is from about 3 to about 20, $c$ is from about 10 to about 50 and wherein the sum of $b$ plus $c$ is not more than about 60.

Typical water-soluble, oxyalkylated nitrogen-containing solubilizing agents include ethoxylated-8-hydroxy quinolines of the general formula:

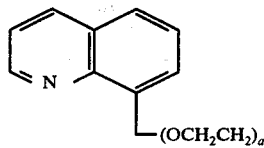

wherein $a$ is, for example, 5, 8, 11 or 25. Propoxylated 8-quinoline sulfonic acid compounds of the formula:

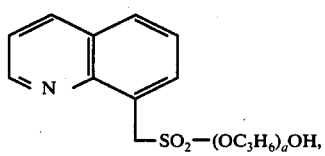

where $a$ is for example 5, 12 or 14, are also highly useful solubilizing agents.

Another group of water-soluble, oxyalkylated, nitrogen-containing solubilizing agents which are highly useful in the process of this invention include compounds of the formula:

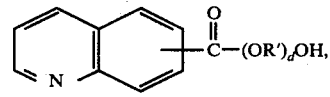

wherein R' is alkylene of from 2 to 5 carbon atoms and $d$ is an integer of from about 5 to about 50. All of the water-soluble, oxyalkylated nitrogen-containing solubilizing compounds set out above can be prepared in the same manner as described in U.S. Pat. No. 3,731,741 which is incorporated herein in its entirety. Typical compounds of this group include:

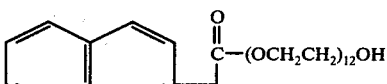    (a)

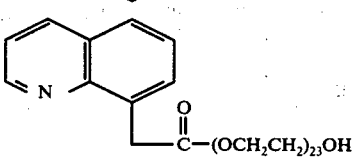    (b)

and

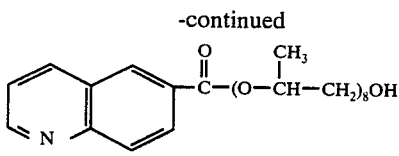 (c)

A wide variety of surfactants such as linear alkylaryl sulfonates, alkyl poly-ethoxylated sulfates, etc. may also be included as a part of the driving fluid composition.

This invention is best understood by reference to the following example which is offered only as an illustrative embodiment of this invention and is not intended to be limitative.

EXAMPLE I

In a field in which the primary production has already been exhausted, an injection well is completed in the hydrocarbon bearing formation and perforations are formed between the interval of 8910–8930 feet. A production well is drilled approximately 405 feet distance from the injection well, and perforations are similarly made in the same hydrocarbon bearing formation at 8915–8935 feet.

The hydrocarbon bearing formation in both the injection well and the production well is hydraulically fractured using conventional techniques, and a gravel-sand mixture is injected into the fracture to hold it open and prevent healing of the fracture.

In the next step water saturated with natural gas at a temperature 60° F. and 5000 psig made alkaline with sodium hypochlorite and containing 0.002 weight percent of a solubilizing agent of the formula:

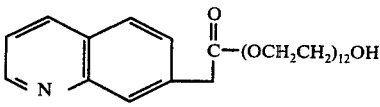

is injected into the formation at this same pressure and at a rate of one barrel per minute. Injection of the driving fluid is continued and at the end of 60 days the rate of production is substantially greater than with water injection alone.

What is claimed is:

1. A fluid comprising water saturated with a gas selected from the group consisting of natural gas, carbon dioxide, ammonia, flue gas and mixtures thereof containing a minor amount of a solubilizing agent consisting of a compound of the formula:

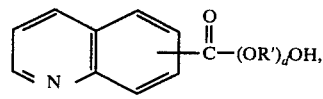

wherein $R'$ is alkylene of from about 2 to 5 carbon atoms and $d$ is an integer of from about 5 to about 50, wherein said fluid is made alkaline through the addition of an alkaline agent selected from the group consisting of sodium hydroxide, potassium hydroxide and sodium hypochlorite.

2. The fluid of claim 1 wherein the said solubilizing agent is present in an amount of from 0.001 to about 0.25 weight percent.

3. The fluid of claim 1 wherein the said fluid is made alkaline through the addition of sodium hydroxide.

4. The fluid of claim 1 wherein the said fluid is made alkaline through the addition of sodium hypochlorite.

5. The fluid of claim 1 wherein the said alkaline agent is contained therein in the range of about 0.001 to about 0.5 molar.

6. The fluid of claim 1 wherein said solubilizing agent is present in an amount of from 0.001 to about 0.25 weight percent and said alkaline agent is contained therein in the range of about 0.001 to about 0.5 molar.

* * * * *